March 31, 1931.  O. U. ZERK  1,798,513

TELESCOPING SUPPORTING LEG AND METHOD OF MAKING SAME

Filed July 25, 1927   2 Sheets-Sheet 1

Inventor
Oscar U. Zerk
By Williams, Bradbury,
McCaleb & Hinkle Attys.

March 31, 1931. O. U. ZERK 1,798,513
TELESCOPING SUPPORTING LEG AND METHOD OF MAKING SAME
Filed July 25, 1927   2 Sheets-Sheet 2
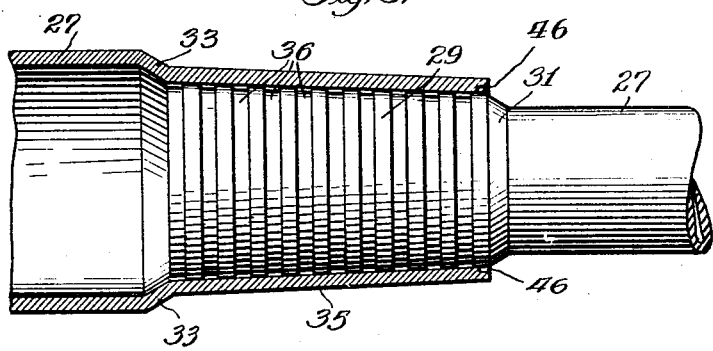
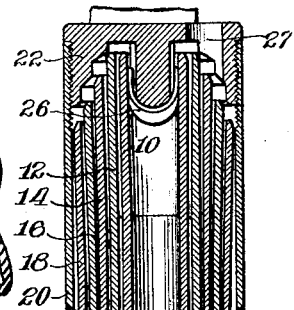
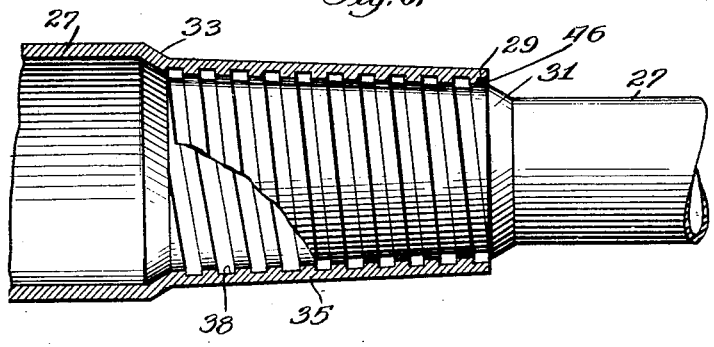
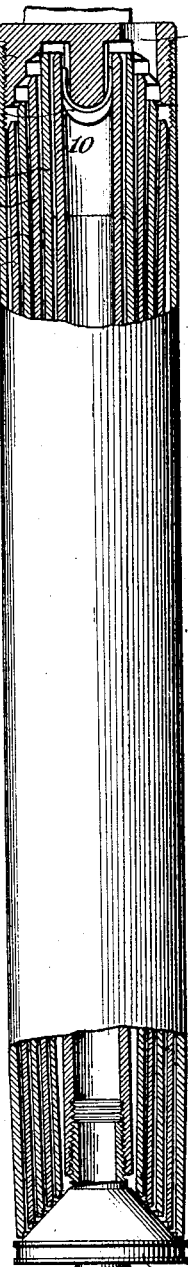
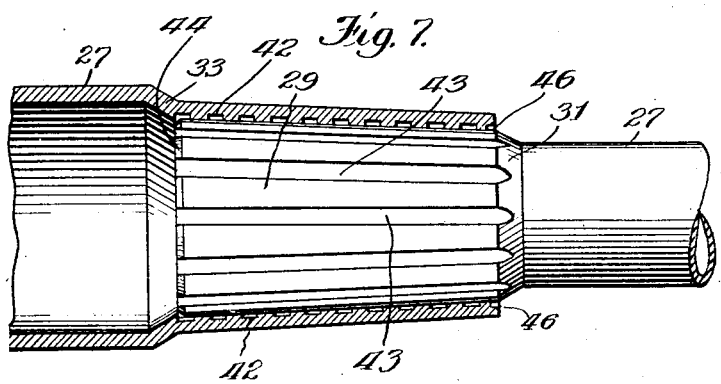
Inventor
Oscar U. Zerk
By Williams, Bradburn, McCabe & Smith Attys.

Patented Mar. 31, 1931

1,798,513

UNITED STATES PATENT OFFICE

OSCAR U. ZERK, OF CHICAGO, ILLINOIS

TELESCOPING SUPPORTING LEG AND METHOD OF MAKING SAME

Application filed July 25, 1927. Serial No. 208,219.

My invention relates to supporting legs, more particularly to improvements in telescoping legs for use with tripods of a general type as shown and claimed in my co-pending application, Serial No. 55,350, filed September 9, 1925.

The objects of my invention are:

First: To provide an improved method of making tripod legs in which frusto-conical friction contact surfaces are utilized in making a rigid connection between sections which are adapted to telescope within one another, by which improved method the sections may be made more accurately and more economically.

Second: To improve the fit between the leg sections by providing means for removing oxide films and other foreign matters from the frusto-conical wedging friction surfaces of the sections.

Third: To provide an improved section for a telescoping tripod leg in which the possibility of the friction contact being destroyed by burrs formed at the ends of the sections is eliminated.

Fourth: To reduce the cost of machining of the tripod leg sections by reducing the length of the frusto-conical contact surfaces of the sections without decreasing the rigidity and strength of the connection made.

Other objects will appear from the following description, reference being had to the accompanying drawings in which:

Fig. 5 is a diametrical cross-sectional view of the end portions of two sections which are in frictional wedging contact, the position taken when the tripod leg is extended, and showing particularly, means for eliminating aluminum oxide and other foreign matter from the friction surfaces.

Fig. 6 is a modification of the structure shown in Fig. 5.

Fig. 7 is a further modification thereof, and

Fig. 8 is an elevation, partly in central vertical section, showing the assembled tripod leg in telescoped position.

Figure 1:
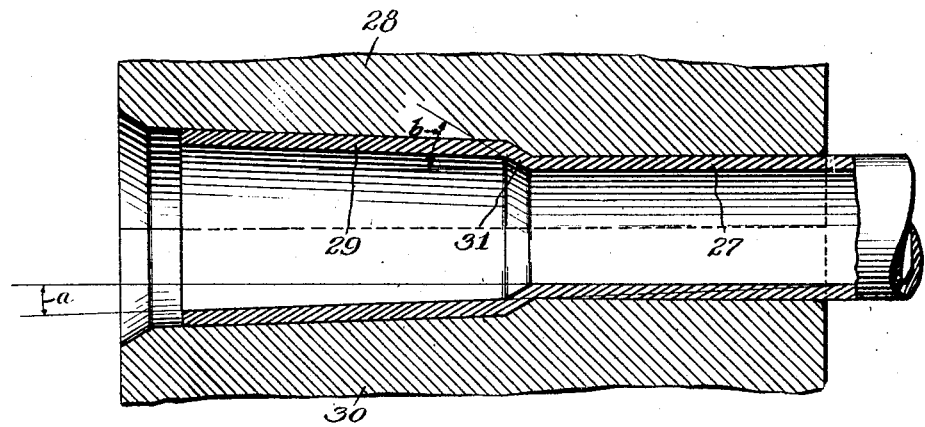
Fig. 1 is a diametrical cross-sectional view of a leg section in the swaging dies used in forming the frusto-conical end portion of the sections.

That the requirements and purposes of my invention may be more clearly understood, I will first describe generally the finished supporting leg and the manner of its use. As shown in Fig. 8, the leg comprises a plurality of telescoping tube sections 12, 14, 16, 18 and 20. The walls of the tubes may be of different thicknesses, the tube 10 having the thickest wall and the remaining tubes having walls of decreasing graduated thickness, although for commercial considerations several of the tubes may have walls of the same thickness. Each of the tubes (with the exception of tube 20) is flared outwardly at its top end, to form a long tapered cone. For the purposes of illustration, I have shown the angle of taper greatly exaggerated, for I have found that an included angle of 0° 50' is sufficient to make the rigid frictional wedging connection which will be described.

The lower ends of each of the tubes (with the exception of the inner tube section 10) are tapered inwardly to correspond with the taper at the upper end of the next adjacent inner tube. The outer tube is threaded to a head 22 and the inner tube has a footpiece 24 secured thereto by a tapered or pipe thread. This type of thread precludes loosening of the foot piece by the frequent shocks to which it is subjected. The tubes are frictionally held in telescoped position as shown by some means such as a U-shaped spring 26 secured to the head 22. The spring 26 exerts sufficient pressure against the inner surface of the tubular section 10 so as normally to hold the leg sections in collapsed position, as shown in Figure 8. If, however, the leg is grasped by the outer section and moved axially downwardly and its movement arrested suddenly, the spring will not exert sufficient pressure to prevent the leg from extending by the force of momentum thus imparted to the inner leg sections. Thus, the spring serves normally to hold the leg in collapsed position but when desired to extend the leg, permits the sections to move and thereby makes it possible easily to extend the leg very rapidly. The head has a suitable air vent 27 which prevents the formation of a partial vacuum within the sections as they are extended. It will be noted that there is some clearance between the upper outer edge of the flared portion of each of the tubes and the inner cylindrical surface of the next adjacent outer tube section, so that after releasing the inner tube 10 from frictional engagement with the spring 26, the tubes will be freely slidable relative to one another. Thus by holding the outer tube in a vertical position the tubes will drop by gravity and due to the consequent momentum, the flared conical portion of each tube will form a rigid frictional wedging connection with the inwardly tapered portion of the next adjacent outer tube. This connection is very rigid and can only be broken with any degree of ease by subjecting the extended leg to a sharp axial blow. The above described construction is more fully described and claimed in my said co-pending application Serial No. 55,350.

Difficulty has been experienced in forming cylindrical aluminum tubing so as to flare outwardly with a very small taper. Ordinary pressing operations are unsuccessful even though a mandrel be used because of the small angle of the flared portion with the axis of the tube, because of its great length, and because of the consequent high friction present when the forming die is inserted or withdrawn when expanding the tube.

This friction results in pressure exerted longitudinally upon the tube and tends to make its cylindrical portion buckle and bend even though a mandrel is used and the tube is held tightly in a suitable jig, since the jigs and mandrels for holding the tubes can not be made to fit the tube exactly due to the slight variations in diameter, thickness and cylindricity of the tube. There is also a tendency for the tube to thicken and bulge at the lower end of the flared portion. Similar undesirable results are obtained when it is attempted to cone down the other end of the tube by means of a press. In view of these difficulties with the prior art methods, I have devised the following method for manufacturing the tripod legs:

A tube 27 of slightly larger outside diameter than the greatest outside diameter of the flared portion that is finally desired, is inserted between a pair of swaging dies, 28 and 30, which have a rapid percussive movement toward and away from each other. As the tube is fed between these dies (from the left, Fig. 1) the tube is hammered down to the proper diameter by the dies, the tube being rotated as it is being fed. The tube is fed into the dies until it lies in the position shown in Fig. 1, when the desired length of the end of the tube will be properly flared. I have found it desirable to employ a die having an angle $a$ of approximately 0° 25', (included angle 0° 50') while the angle $b$ may be considerably greater, say about 10° (included angle 20°). Both of these angles are greatly exaggerated in the drawing so that the nature of my invention may be more clearly understood.

Figure 3:
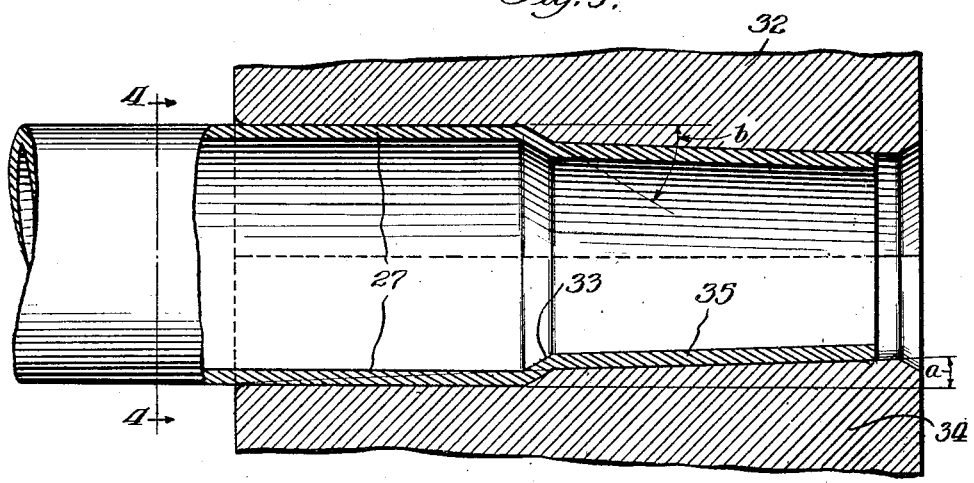
Fig. 3 is a view similar to Fig. 1 showing the dies used in making the reduced frustoconical end portions of the sections.
Figures 2, 4:
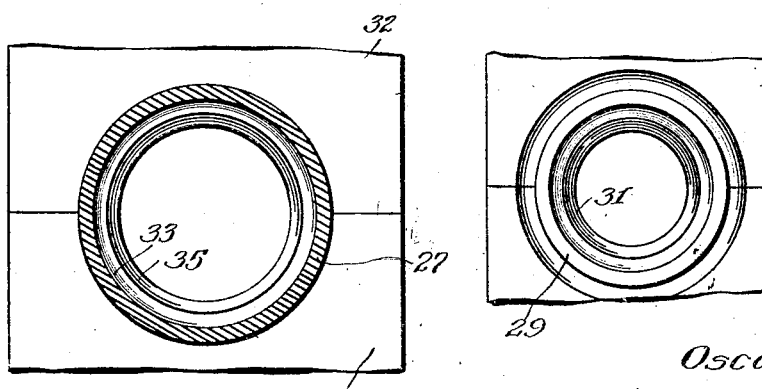
Fig. 2 is an elevation taken from the left of Fig. 1.
Fig. 4 is a view taken on a line 4—4 of Fig. 3.

After this operation the other end of the tube is coned down, as shown in Fig. 3, by a pair of swaging dies 32 and 34, which are actuated in the same manner as the dies 28 and 30. The tube 27 is fed between the dies from the left (Fig. 3) and is continuously rotated, until the desired length of the end portion of the tube is properly formed.

By these two operations the cylindrical tube 27 is formed at one end with a frusto-conical flared portion 29, a sharply flared portion 31 and at the other end with a sharply inwardly tapered portion 33, and a slightly inwardly tapered portion 35.

Having thus more or less roughly formed the tube section, the next operation is shaving the inner frusto-conical surface of the portions 35 of the tubes and the outer frusto-conical surface of the portions 29. I will briefly explain the reasons for shaving the conical portions of the tubes to the peculiar shapes illustrated in Figs. 5, 6 and 7.

I have discovered that heat treated and aged aluminum or magnesium alloys are the best materials of which to make the tube sections 27. These alloys are light in weight, and have the properties necessary to the making of a very tight joint in a telescoping leg as above described. When exposed to air these alloys oxidize quickly, forming a very thin film of aluminum or magnesium oxide which acts as a dry lubricant similar to graphite, permitting the flared end 29 of the inner section to wedge itself more deeply within the inwardly coned portion 35 of the next adjacent outer section. However this oxide film also has a serious disadvantageous effect, for after the leg has been extended a number of times, the oxide is rubbed from the conical contacting surfaces and forms small balls and rolls, which increase in size and number each time the leg is extended as a newly formed layer is rubbed from the contacting surfaces. Although these balls and rolls are in the form of a packed powder, they become very hard when subjected to the high pressures obtained between the two wedging conical surfaces as the wedging connection is made by impact. The balls of the oxide powder prevent perfect seating between the leg sections and score and pit the conical surfaces, not only forming depressions therein but also forming projecting burrs which materially decrease the strength and rigidity of the connection formed when the leg is extended.

To overcome this difficulty I preferably cut a plurality of shallow annular grooves 26 (shown exaggerated in Fig. 5) in the outer surface of the flared portion 29. The sharp edges of the intermediate ridges formed by cutting these grooves scrape the oxide film from the inner surface of the portion 35 and permit it to collect in the grooves 36, where it is incapable of marring the conical surfaces. I have thus devised a means for overcoming the disadvantageous features encountered when using aluminum or magnesium alloy tubing while retaining the advantages incident to the use of these materials.

In lieu of cutting the annular grooves in the portions 29, the annular grooves may be cut in the coned portions 35, in which case the surface of the flared portions 29 will be shaved smooth.

A further method of preventing the oxide from scoring the walls of the conical wedging surfaces is illustrated in Fig. 6 and comprises cutting helical grooves 38 in the coned portion 35 of each of the tubes and cutting a similar helical groove 40 in the flared portion 29 of the tube. These helical grooves are cut in opposite directions so that the surfaces of contact will be warped diamond-shaped and the tubes will not interlock, but will form the desired rigid connection by the wedging frictional contact between these diamond-shaped surfaces.

Another method of removing the oxide coating from the contacting surface is shown in Fig. 7 and comprises cutting annular grooves 42 in the coned portion 35 of the tube and cutting spaced longitudinal flutes in the flared portion 29 of the tube. In each of these instances the edges of the ridges formed between the grooves will scrape the oxide coating from the contacting surfaces of the conical portions of the tubes and permit it to be deposited within the grooves thus preventing it from coming between the contact surfaces and marring them. The flutes 43 in the portions 29 permit the oxide to fall out of the grooves 42.

The purpose of the sharply tapered portions 33 and 31 of the tubes will now be explained. In my prior construction as disclosed in the aforesaid co-pending application, the tube was flared with a constant angle taper from its cylindrical portion to the end of the tube and similarly coned with a constant taper. Since, however, it was necessary to provide clearance between the greatest outside diameter of the flared portion and the inside diameter of the cylindrical portion of the next adjacent outer tube, a large portion of the tapered conical surfaces was not utilized in making the frictional wedging connection. I therefore have eliminated the necessity of shaving the portions of the conical surface which are not used, by shaping the tubes to provide the steep tapers 31 and 33, and since the shaving operation is expensive, I have materially decreased the cost of making the sections, and at the same time increased their efficiency in operation.

In Fig. 8 it will be noted that the upper outer portions of each of the flared ends of the tubes 10, 12, 14, 16 and 18 are cut away, forming a chamfer. This chamfer is cut to prevent the formation of a burr at this edge of the tube, since from the blow incident to collapsing the tripod, the ends of the tubes must necessarily forcibly strike against the head 22 and footpiece 24. In so doing the upper edges of the flared portions formerly were burred outwardly so that upon the next extension of the leg the burrs engaged the inner conical surface of the coned portion 35 of the next adjacent outer section and prevented a proper seat between these portions. Similarly the lower ends of the coned portions 35 were burred inwardly by the impacts with the foot piece 24 as the leg was collapsed. I therefore provide a chamfer 44 at the upper edge of the flared portion 29 and a similar chamfer 46 at the lower end of the coned portion 35. This chamfer may be a bevel or a suitable groove. Of course where, as in Fig. 5, a groove is at the end of the flared portion 29 or at the end of the coned portion 35, this groove takes the place of the chamfer.

While I have shown and described particular embodiments of my invention and a particular method of making the tripod legs, I wish it to be understood that I do not wish to limit myself to the particular features disclosed. For example, in the swaging operation a mandrel may be used although I have illustrated and described this operation as being performed without a mandrel. Again the conical wedging friction surfaces may be formed in other ways to provide the scraping edges for removing the oxide film. I therefore do not desire the scope of my invention to be limited except by the claims which follow.

I claim:

1. A telescoping supporting leg for use in tripods and the like, comprising a plurality of tubular sections made of an alloy slightly oxidizable at room temperature, said sections when extended having portions in wedging frictional contact, and means for removing the oxide formed upon said portions upon extension of said sections, comprising ridges formed on said portions.

2. A telescoping supporting leg for use in tripods and the like, comprising a plurality of tubular sections made of an aluminum alloy, said sections when extended having portions in wedging frictional contact, and means operable upon extension of said sections for removing the oxide formed upon said portions comprising scraping edge formed on one of said portions and longitudinal grooves in the cooperating surface of the other portion.

3. A telescoping supporting leg for use in tripods and the like, comprising a plurality of tubular sections made of an alloy slightly oxidizable at room temperatures and adapted to be moved axially into extended position, said sections having cooperating surfaces to form a rigid wedging frictional connection between the sections, and means operable upon extension of said sections for removing the oxide formed on said surfaces comprising transverse scraping edges on said surfaces.

4. A telescoping supporting leg for use in tripods and the like, comprising a plurality of tubular sections made of an aluminum alloy and adapted to be moved axially into extended position, said sections having cooperating surfaces to form a rigid wedging frictional connection between the sections, and means for removing the oxide formed on said surfaces while the leg sections are being extended, said means comprising transverse grooves in one of said surfaces.

5. A telescoping supporting leg comprising a plurality of tubular sections made of an oxidizable alloy and having frusto-conical frictional wedging surfaces, said sections having means operable upon extension of said section for scraping the oxide film from said surfaces including shallow helical grooves cut in said surfaces, said grooves leading in opposite directions.

6. A telescoping supporting leg composed of a plurality of tubular sections, each of said sections having an outwardly flaring frusto-conical portion at one end and an inwardly tapering frusto-conical portion at the other end, the inwardly tapering portion of one section being adapted to form a rigid frictional connection with the outwardly flaring portion of the next adjacent inner section, and means for preventing the formation of burrs at the ends of said sections comprising chamfers around the outer upper edge of the flaring portion and around the inner lower edge of the inwardly tapered portion.

7. A tubular telescoping leg section cylindrical throughout the greater portion of its length, one end thereof tapering outwardly at a relatively large angle for a short distance, and then at a relatively small angle, and the other end thereof tapering inwardly at a relatively large angle for a short distance and then at a relatively small angle.

In witness whereof, I hereunto subscribe my name this 20 day of July, 1927.

OSCAR U. ZERK.